United States Patent Office 2,777,859
Patented Jan. 15, 1957

2,777,859

WARFARIN-ALKALI METAL DERIVATIVES AND PROCESSES OF PREPARING THE SAME

Karl Paul Link, Middleton, Wis., assignor to Wisconsin Alumni Research Foundation, Madison, Wis., a corporation of Wisconsin No Drawing. Application February 5, 1953,
Serial No. 335,391

7 Claims. (Cl. 260—343.2)

The present invention relates to warfarin known chemically as 3-(α-acetonylbenzyl)-4-hydroxycoumarin, and more particularly to the alkali metal derivatives thereof and improved processes of preparing the same. The present invention is especially directed to the warfarin-sodium derivative (sometimes termed sodium warfarinate) in both the aqueous solution and solid or dry forms, and the process of preparing the same.

The use of warfarin in the rodenticide field has been known for some time and its outstanding accomplishments in this field have been widely recorded. Ross, Ward, Agricultural Chemicals, October, 1951; Link, K. P., Richards, C. A., Ross W., Unpublished W. A. R. F. Report. Warfarin, however, at best is only very slightly soluble in water and the need for a water soluble warfarin and particularly an improved water soluble derivative acceptable to both (1) the rodent for use in the rodenticide field and (2) the medical profession for use in the clinical field, has been recognized. In addition to water solubility, the product desired for use in the rodenticide field should be substantially odorless and tasteless, and the product desired for use in the clinical field should be in pure, stable form. While the desires or requirements in the two fields are thus not necessarily identical, they are nevertheless tied together as shown hereinafter.

In the attempts to solve the problem and provide an aqueous solution of warfarin for use in the rodenticide field, it was initially discovered that the enolic form of warfarin formed a sodium derivative when dissolved in an aqueous solution of sodium hydroxide and that the resulting alkali metal enolate was very soluble in water. The reaction involved may be illustrated by the following formula, in which warfarin is shown in its enolic form:

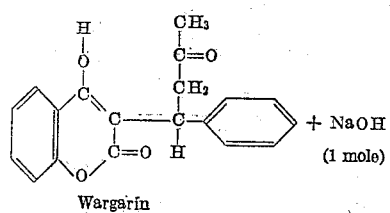

Warfarin
(1 mole)

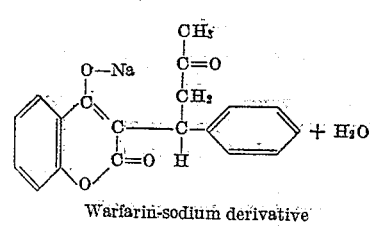

Warfarin-sodium derivative

Solutions prepared by adding 1 mole of dry warfarin to 1 mole of aqueous NaOH or the reverse proved unsatisfactory, possibly due to the presence of degradation products caused by the opening up or hydrolysis of the lactone ring. Other carefully controlled experiments employing warfarin suspended in water to which alkali metal pellets were added, in a mole for mole ratio, resulted in warfarin-sodium derivative solutions which proved on trial to be relatively unsatisfactory for use in the rodenticide field. See Crabtree, D. Glen, Soap and Sanitary Chemicals, February, 1950. Due to the low solubility of warfarin in water, solutions of warfarin in non-aqueous solvents, e. g. ethanol, acetone and dioxan, were also reacted with aqueous solutions of alkali on a mole for mole basis. This approach proved impractical and was discarded.

With the failure of the usual aqueous reaction conditions to solve the problem non-aqueous reaction mediums were tried for the preparation of the dry alkali metal derivative. Indeed, the teachings of organic chemistry would lead one to think that the correct (proper) or sensible (practical) way to prepare the warfarin-sodium derivative, particularly in the dry solid form, would be to use an alcohol solution of an alkali metal alkoxide such as sodium alkoxide in a dry (water-free) system. This approach, however, proved unsatisfactory in my laboratory and other laboratories. The reaction of 1 mole of warfarin with 1 mole of sodium methylate in methyl alcohol, for example, did not yield a satisfactory product. The reaction with sodium ethylate in absolute ethanol on a mole for mole basis followed by evaporation or precipitation with ether also yielded unsatisfactory products.

With the failure of the expensive and hazardous organic solvent reaction mediums to solve the problem, research investigations were then continued with aqueous reaction mediums, although this approach was contrary to the "text book" know-how of organic (enolic) chemistry. After many unsuccessful attempts to solve the problem— a problem that initially appeared relatively simple—it was finally discovered that a warfarin-sodium derivative solution acceptable for use in the rodenticide field could be prepared by reacting warfarin with aqueous sodium hydroxide, providing excess warfarin was present in the reaction mixture. Processes disclosing preparations of this type are described in my copending application Serial No. 277,080, filed March 17, 1952. Attempts, however, to convert these preparations into usable solutions or a usable dry solid form for clinical purposes proved unsuccessful and the research investigation continued.

Many experiments were carried out with warfarin-sodium derivative aqueous solutions made with excess warfarin under varying conditions and employing various drying techniques, including drying under reduced pressure, etc. They all yielded clinically unsatisfactory solutions and dry products. Some of the dry products which initially "looked pretty good," proved to be unstable on standing as evidenced by change in color, turning into gummy or glass type masses and the like. After many failures it was concluded that if clinically satisfactory products were to be produced (a) a different method of preparing the aqueous solution of the warfarin-sodium derivative would have to be developed, or (b) a new method of drying the warfarin-sodium derivative solution would have to be developed or (c) a combination employing both (a) and (b) would have to be developed. The discoveries made with further research and which led to the present invention proved (c)—i. e. an improved method of preparing the solution combined with an improved drying method—to be required.

The improved process of the present invention includes as essential steps (1) the use of excess warfarin over and above the amount that will react with the amount of alkali metal hydroxide used to form the alkali metal derivative, (2) the wetting of the warfarin with water before contact or reaction with aqueous alkali metal hydroxide, (3) the heating of the warfarin alkali metal hydroxide reaction mixture in the presence of excess warfarin to insure complete conversion of all alkali metal hydroxide to the warfarin alkali metal derivative, and, for the preparation of the dry, stable alkali metal derivative, the use of the above three steps coupled with (4) the drying of the resulting solution with added ethanol under reduced pressure.

In step 1 above, 2–10% excess warfarin is satisfactory, although the amount used is not critical as long as the warfarin alkali metal hydroxide reaction mixture contains some free or unreacted warfarin. The unreacted or excess warfarin may be recovered and reused. In step 2 above, all particles of warfarin should be wetted with water. For carrying out the reaction with the wet or wetted warfarin, it is preferred to slowly add an aqueous alkali metal hydroxide solution to a warfarin-water slurry with vigorous agitation. This procedure avoids the possibility of local alkalinity and resulting degradation of warfarin. In step 3 above, it is preferred to only warm the reaction mixture employing temperatures up to about 60° C. This is adequate to insure that all of the alkali metal of the alkali metal hydroxide has been "fixed" in the form of the desired warfarin-sodium or other alkali metal derivative. In step 4 above, the bath temperature should not exceed about 80° C. and it is preferred to lower the temperature to about 50° C. as the solution becomes syrupy. These temperatures will maintain the solution at about 60° C. or below and the moist or dry product at temperatures of 50° C. or below. The warfarin employed in the process should be substantially pure and essentially odorless and tasteless of the rodenticide grade.

The following examples will serve to illustrate the invention.

EXAMPLE I

*Preparation of aqueous solution of warfarin-sodium derivative*

A warfarin-water slurry is first prepared by mixing about 350 ml. of distilled water with 110 grams of warfarin (⅓ mole 103 g.+7 g. excess warfarin). A solution of sodium hydroxide is next prepared by dissolving 13.3 grams of analytical reagent sodium hydroxide (⅓ mole NaOH) in about 50 ml. of distilled water and the resulting solution allowed to cool to room temperature. The solution of sodium hydroxide at room temperature is then added slowly, essentially drop-wise, and under vigorous agitation, to the warfarin-water slurry at room temperature over a period of about fifteen minutes. After the sodium hydroxide has been added the resulting solution will have a pH of about 8.0 as indicated by Hydrion paper A. The reaction mixture containing the warfarin-sodium derivative in solution and excess warfarin in suspension, is next heated to about 50–60° C. for about fifteen minutes. The excess warfarin is recovered by filtration and to the clear, although sometimes slightly yellow filtrate, 10 to 20 grams of activated carbon (e. g. Darco G-60) are next added. The temperature of the solution while being treated with the activated carbon may be from room temperature to about 40° C. with an exposure time of five minutes or longer. The carbon is then removed by filtration through a suitable filter pad carrying a filter aid (e. g., Filter-Cel). The resulting water clear filtrate made up of the improved solution of warfarin-sodium derivative contains approximately 21.4% by weight of the warfarin-sodium derivative or 20% warfarin on the weight basis. The solution may be advantageously applied to carriers such as silica for use in the preparation of water baits as described in my copending application Serial No. 277,080, filed March 17, 1952. The solution may also be employed in the preparation of dilute solutions suitable for administering the sodium derivative by injection clinically, as well as in the preparation of the warfarin-sodium derivative in the dry, solid stable form as described in the following example.

EXAMPLE II

*Preparation of stable warfarin-sodium derivative in the solid form*

The warfarin-sodium derivative solution obtained by the process of Example I (containing about 21.4% of the warfarin-sodium derivative by weight) is first concentrated under reduced pressure of about 12–20 mm. with a bath temperature of about 80° C. until the solution is in a light to medium syrupy stage. At this stage about ¾ of the water has been removed. The removal of water is then continued with a bath temperature of about 50° C. until the heavy syrupy stage is reached. At this point about 100 ml. of absolute ethanol are added to promote and hasten the drying of the warfarin-sodium derivative. The addition of the ethanol serves a very important purpose. Through its addition and subsequent evaporation the removal of volatile impurities like benzalacetone is promoted. Its addition also causes the very hygroscopic glass-like warfarin-sodium derivative to undergo a change in physical state to a light friable form—which can readily be crumbled (ground) to a powder. After the first increment of ethanol has been removed by evaporation at 12–20 mm., with the bath temperature not above 50° C., a second increment of about 100 ml. absolute ethanol is preferably added, to complete the conversion of any glass-like warfarin-sodium derivative to the light friable form. The alcohol and water are removed as indicated above. The drying of the product is continued in the flask by heating under reduced pressure (12–20 mm.) at about 50° C. for about 2 to 4 hours. Finally the product is removed from the flask and ground to a fine powder. It is preferable to dry the powdered product again for several hours (2 to 4) under reduced pressure (10 mm. or less at 40–50° C. to remove any moisture taken up in the process of transferring from the flask. The yield is 95–99% of theory. Theory demands from 103 grams of warfarin approximately 110 grams of warfarin-sodium derivative; 105 to 109 grams of the product have been realized consistently. The warfarin-sodium derivative derived as indicated above will have a sodium content of 6.90–7.00 percent, theory demands 6.94 percent. The warfarin content determined spectrophotometrically (as warfarin) will range from 99 to 100% (density read at 308 m$\mu$ in a Beckman spectrophotometer; the extinction coefficient for warfarin in dilute sodium hydroxide (1 mg. percent, 1 cm.) is 0.459).

Extensive tests have demonstrated the alkali metal derivative to be free from free alkali and, as products containing free alkali have been discovered to be unstable, this "free from free alkali" characteristic undoubtedly plays an important role in stability. The dry product is also free from alkali degradation products which render the product unsatisfactory.

EXAMPLE III

*Preparation of warfarin-sodium derivative solution*

To 122 grams of distilled water 32.4 grams of sodium hydroxide (analytical reagent minimum purity 97%) are added and the mixture stirred until the sodium hydroxide dissolves. A water slurry of warfarin is prepared by adding 260 grams of warfarin, rodenticide grade, to 743 grams of distilled water, and mixing intimately. This warfarin-water slurry contains 10 grams of warfarin in excess over the theoretical quantity (250 gm.) necessary to react with the 32.4 grams of sodium hydroxide. The solution of sodium hydroxide at room temperature is added slowly, essentially drop-wise, and under vigorous agitation, to the warfarin-water slurry over a period of about 10 to 20 minutes. The slow addition of the sodium hydroxide solution to the wet warfarin (warfarin-water slurry) accompanied by vigorous agitation avoids degradation caused by local (excess) alkalinity. The solution of warfarin-sodium derivative, containing the excess of free warfarin in suspension, is warmed to about 60° C. for about 10 to 20 minutes, to insure complete conversion of all the Na of the NaOH to the warfarin-sodium derivative. The solution is filtered with or without a filter aid and the excess (undissolved) warfarin is recovered in the filtration operation and can be reused for subsequent batches.

To the clear (very faintly yellow) solution of warfarin-sodium derivative, 20 to 40 grams of activated carbon are added and the mixture stirred for at least five minutes at 25°–40° C. Activated carbon which is not highly acidic such as Darco G–60 is satisfactory. The carbon is then removed by filtration through a filter pad carrying a filter aid like "Filter-Cel." The final clear and substantially colorless solution contains approximately 23.4% by weight of warfarin-sodium derivative (or 21.8% by weight on the warfarin basis). Solutions of different warfarinate concentrations up to approximately 60% by weight can be readily prepared by varying the amounts of ingredients. The 23.4% by weight aqueous solution of warfarin-sodium derivative described above, like the solution of Example I, can be used to prepare solutions suitable for clinical purposes and be converted to the dry stable form as described in Example II. It can also be used to impregnate silica and the like for fountain-baiting as disclosed in my previously referred to application, Serial No. 277,080. In addition, suitably diluted solutions may be injected into dead carcasses, e. g., horse, sheep, etc., for use as coyote and like bait.

To prepare dry food bait for rodent control, containing .01 to .05% warfarin, the officially approved and widely used warfarin level being .025%, suitable water dilutions (solutions containing 0.5, 1, 2 or 5% of warfarin by weight) may be readily made. The dry warfarinized food baits are prepared by spraying the aforementioned dilute water solutions of warfarin-sodium derivative on whole grains and seeds or particles of whole grains and seeds (varying in particle size from cracked grains to ground meals) or on pellet like structures made from the ground meals of the appropriate grains and seeds, such as corn, wheat, oats, rice, barley, chuffa, seeds, etc. In previous commercial operations, such as those disclosed in my copending application Serial No. 237,480, filed July 18, 1951, employing multiple coatings, i. e. warfarin, mineral oil and corn syrup on grain particles, the actual coating with warfarin has been done with an ethanolic solution of warfarin since the solubility of warfarin in water at room temperature, as pointed out above, is extremely limited. The availability of the present invention's improved aqueous solutions of warfarin in the form of warfarin-sodium derivative of virtually any concentration up to 60% for the art of coating or impregnating grain or grain particles, thus materially advances the rodenticide manufacturing art as practiced commercially heretofore as it eliminates fire hazards, alcohol tax costs, and the occupational risks involved in the handling of ethanolic solutions.

The dry warfarin-alkali metal derivative obtained as described above in Example II is a stable, free-flowing powder and is truly a new composition of matter not heretofore available. It is about 75,000 times more soluble in water than warfarin and while it may be used in the preparation of both improved food and water rodenticide baits, it is of the type desired for clinical use. It is in this latter field where the dry stable product is of special value. It may be tableted, or capsuled for oral use, or dispensed dry in ampules to which water is added prior to administration by injection. The warfarin alkali metal derivative of the present invention provides the medical profession with a water soluble 4-hydroxycoumarin anticoagulant which can thus be administered orally and intravenously. When given in this latter route in solution form by injection the clinical results show the following advantages over the widely used "Dicumarol", 3,3′-methylene-bis(4-hydroxycoumarin) and cyclocumarol: (1) higher or more potent anticoagulant (hypoprothrombinemic) action on a mg./kg. body weight basis, (2) more rapid onset of the induced hypoprothrombinemia, and (3) greater predictability or uniformity of response, i. e. less individual variation in hypoprothrombinemia between patients. With its outstanding anticoagulant activity, it provides another important tool for use by the medical profession.

In the above description any of the alkali metal hydroxides such as potassium hydroxide, may be used in place of sodium hydroxide. They are equivalents but for practical purposes (e. g. expense of ingredient) the use of sodium hydroxide with the resulting warfarin-sodium derivative is generally preferred in both the rodenticide and clinical fields.

I claim:

1. In the process of preparing an aqueous solution of warfarin-alkali metal derivative, the improvement which comprises slowly adding with stirring aqueous alkali metal hydroxide to an excess of water wet warfarin, warming the resulting aqueous reaction mixture containing warfarin-alkali metal derivative in solution in the presence of the excess warfarin in suspension, and then removing the excess warfarin from the solution.

2. In the process of preparing an aqueous solution of warfarin-alkali metal derivative, the improvement which comprises slowly adding with stirring an aqueous alkali metal hydroxide solution to a warfarin-water slurry containing an excess of warfarin, heating the resulting aqueous reaction mixture containing warfarin-alkali metal derivative in solution and the excess warfarin in suspension up to about 60° C., and then removing the excess warfarin from the solution.

3. The process which comprises slowly adding with agitation an aqueous sodium hydroxide solution at room temperature to a warfarin-water slurry containing an excess of warfarin, heating the resulting reaction mixture containing warfarin-sodium derivative in solution and the excess warfarin in suspension to about 50–60° C., and then removing the excess warfarin from the solution.

4. The process which comprises slowly adding with vigorous agitation an aqueous alkali metal hydroxide solution at room temperature to a warfarin-water slurry containing an excess of warfarin, heating the resulting reaction mixture containing warfarin-alkali metal derivative in solution and the excess warfarin in suspension to about 50–60° C., removing the excess warfarin, treating the resulting clear solution with activated carbon, and then removing the carbon and recovering the resulting substantially colorless warfarin-alkali metal derivative solution.

5. The process of preparing a dry, stable warfarin-alkali metal derivative which comprises concentrating the solution of claim 4 under reduced pressure and a bath temperature not exceeding 80° C. until the light to medium syrupy stage is reached, continuing concentrating the solution under reduced pressure at a bath temperature of about 50° C. until the heavy syrupy stage is reached, adding ethanol to the resulting solution and continuing the drying operation under reduced pressure at a temperature of about 50° C. until a dry product is obtained.

6. The process which comprises slowly adding with vigorous agitation an aqueous sodium hydroxide solution at room temperature to a warfarin-water slurry containing an excess of warfarin, heating the resulting reaction mixture containing warfarin-sodium derivative in solution and the excess warfarin in suspension to about 50–60° C., removing the excess warfarin, treating the resulting solution with activated carbon at about room temperature up to 40° C., and then removing the carbon and recovering the resulting substantially colorless warfarin-sodium derivative solution.

7. The process of preparing a dry, stable warfarin-sodium derivative which comprises concentrating the solution of claim 6 under reduced pressure of about 10-20 mm. and a bath temperature not exceeding 80° C. until the light to medium syrupy stage is reached, continuing concentrating the solution under reduced pressure at a bath temperature of about 50° C. until the heavy syrupy stage is reached, adding ethanol to the resulting solution, continuing the drying operation under reduced pressure at a temperature of about 50° C. until a light friable dry product is obtained, and then grinding the dry product to a fine, free flowing powder.

References Cited in the file of this patent

UNITED STATES PATENTS

| | | |
|---|---|---|
| 2,427,578 | Stahmann et al. | Sept. 16, 1947 |
| 2,441,602 | Snow et al. | May 18, 1948 |
| 2,601,204 | Campbell et al. | June 17, 1952 |
| 2,648,682 | Stoll et al. | Aug. 11, 1953 |

OTHER REFERENCES

Prentiss Publication, "RAX Powder Containing Warfarin," Prentiss Drug and Chem. Co., 110 William St., New York 38, N. Y., Oct. 1, 1950, 8 pp.

Chem. Engineers' Handbook, 3rd ed., McGraw-Hill (J. H. Perry, Editor), pp. 631-34.